E. KILCUP.
ICE CREEPER FOR HORSES.
APPLICATION FILED JAN. 9, 1911.
1,051,895.
Patented Feb. 4, 1913.
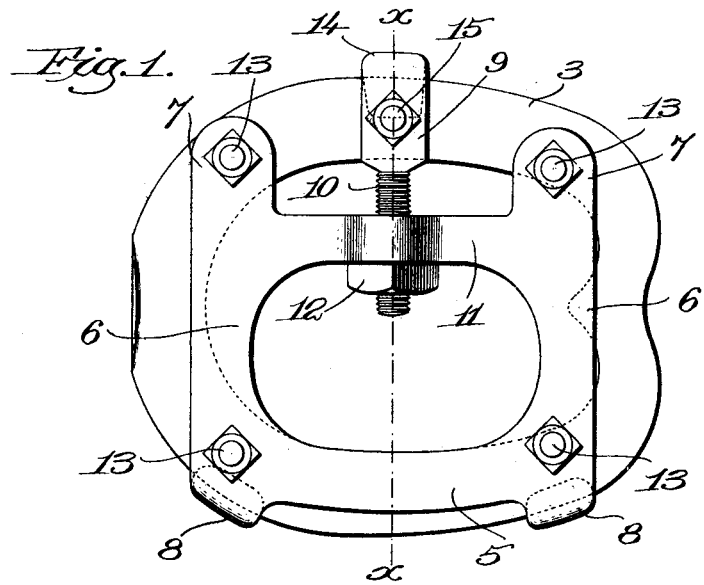
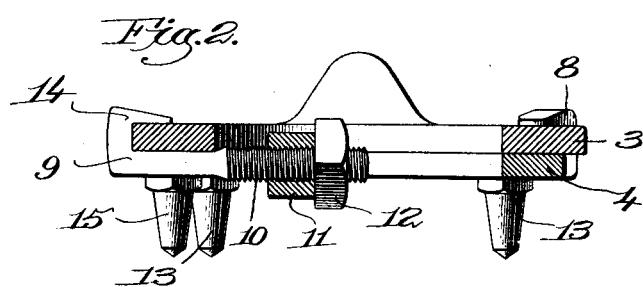
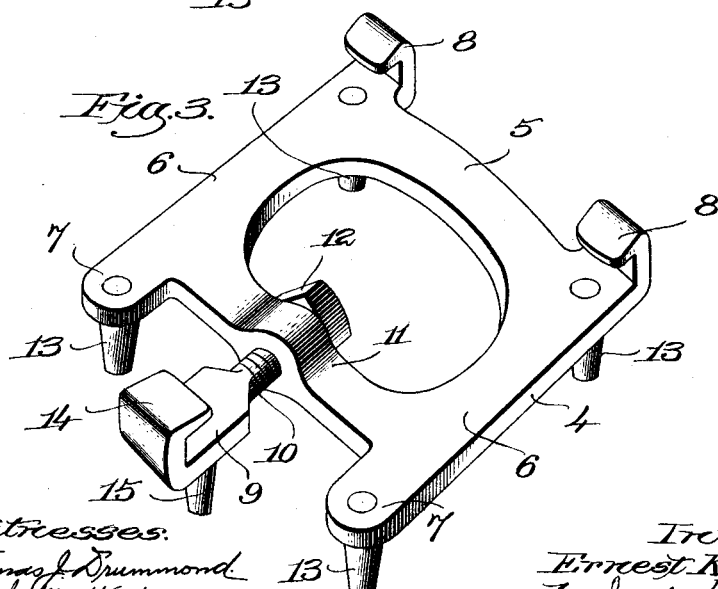
Witnesses:
Thomas J. Drummond
Joseph M. Ward
Inventor.
Ernest Kilcup,
by Crosby Gregory
Attys.

UNITED STATES PATENT OFFICE.

ERNEST KILCUP, OF BOSTON, MASSACHUSETTS.

ICE-CREEPER FOR HORSES.

1,051,895.  Specification of Letters Patent.  Patented Feb. 4, 1913.

Application filed January 9, 1911. Serial No. 601,720.

*To all whom it may concern:*

Be it known that I, ERNEST KILCUP, a citizen of the United States, residing at Boston, county of Suffolk, and State of Massachusetts, have invented an Improvement in Ice-Creepers for Horses, of which the following description, in connection with the accompanying drawing, is a specification, like characters on the drawing representing like parts.

This invention relates to ice creepers for horses and has for its object to provide a novel ice creeper which can be readily attached to a shoe or detached therefrom and which is constructed so that when applied to the shoe it will be firmly clamped thereon.

The novel features of my invention will first be described and then pointed out in the appended claim.

Referring now to the drawings, Figure 1 is an underside plan view of a horseshoe having my ice creeper applied thereto; Fig. 2 is a section on the line x—x, Fig. 1; Fig. 3 is a perspective view of the ice creeper removed.

3 designates a horseshoe having any suitable or usual construction.

My improved ice creeper comprises a plate or member 4 which is adapted to underlie the horseshoe 3 and is shaped so that it will bear against a horseshoe on both sides thereof. The plate herein shown is provided with the side bar 5 which underlies one side of the horseshoe and with the cross bars 6 which are of sufficient length so that the ends 7 thereof underlie the opposite side of the horse shoe, as clearly seen in Fig. 1. The plate 4 is provided with the lips 8 that are adapted to embrace the edge of the horseshoe, as seen in Fig. 2, and the device is held in position by a clamping member 9 having a lip 14 which is adapted to embrace the opposite edge of the horse shoe. This clamping member 9 is provided with a screw-threaded stem 10 which extends through a bridge piece 11 connecting the two cross members 6 and said stem is engaged by a clamping nut 12 which occupies the central opening in the plate. The plate 4 is provided with several calks 13, and these may conveniently be removable calks which are screwed into the plate in a manner similar to the well-known never-slip calk. The clamping member 9 is also provided with a calk 15 which may conveniently be of the removable type, although this is not essential.

In using this device it may be readily placed on the horseshoe with the lips 8 embracing one side thereof and the clamping member 9 may then be placed in position with the stem 10 extending through the bridge piece 11 and the lip 14 embracing the opposite side of the horseshoe, after which by tightening up the nut 12 the device will be securely clamped to the horseshoe, as will be obvious.

My ice creeper can be very easily made and quickly applied or removed from a horseshoe.

Having fully described my invention, what I claim as new and desire to secure by Letters Patent is:—

In an ice creeper for horseshoes, the combination with a plate having a central aperture thereby to present a portion 5 to underlie one side of the horseshoe, two end portions 6 to underlie the front and rear ends of the horseshoe, and a bridge pier 11, said end portions 6 extending beyond the bridge piece to form arms or portions 7 that underlie the opposite side of the horseshoe, said bridge piece being so situated that when the ice creeper is applied to the horseshoe, the bridge piece will be situated inside of said opposite side of the horseshoe, of lips 8 extending upwardly from the portion 5 of the plate and adapted to embrace the edge of the horseshoe, a clamping member 9 adapted to underlie the portion of the horseshoe with which the arms 7 engage and said member 9 having a lip 14 to embrace the edge of the horseshoe and provided with an inwardly-extending screw-threaded shank which extends through the bridge piece 11, and a nut screw-threaded to said shank and clamping the creeper to the horseshoe, said plate and said clamping member each having calks extending therefrom.

In testimony whereof, I have signed my name to this specification, in the presence of two subscribing witnesses.

ERNEST KILCUP.

Witnesses:
LOUIS C. SMITH,
THOMAS J. DRUMMOND.

---

Copies of this patent may be obtained for five cents each, by addressing the "Commissioner of Patents, Washington, D. C."

Correction in Letters Patent No. 1,051,895.

It is hereby certified that in Letters Patent No. 1,051,895, granted February 4, 1913, upon the application of Ernest Kilcup, of Boston, Massachusetts, for an improvement in "Ice-Creepers for Horses," an error appears in the printed specification requiring correction as follows: Line 78, for the word "pier" read *piece;* and that the said Letters Patent should be read with this correction therein that the same may conform to the record of the case in the Patent Office.

Signed and sealed this 18th day of March, A. D., 1913.

[SEAL.]

C. C. BILLINGS,

*Acting Commissioner of Patents.*